United States Patent [19]
Tuutijärvi et al.

[11] Patent Number: 5,870,675
[45] Date of Patent: Feb. 9, 1999

[54] METHOD FOR IMPROVING HANDOVER

[75] Inventors: Mika Tuutijärvi; Raimo Klemetti; Jorma Savolainen; Eero Mäkikallio, all of Oulu, Finland

[73] Assignee: Nokia Mobile Phones, Ltd., Salo, Finland

[21] Appl. No.: 664,245

[22] Filed: Jun. 7, 1996

[30] Foreign Application Priority Data

Jun. 9, 1995 [FI] Finland ................................. 952844

[51] Int. Cl.$^6$ ................................................ H04J 3/16
[52] U.S. Cl. ........................ 455/436; 455/442; 370/331
[58] Field of Search .................................. 455/436, 376, 455/377, 438, 437, 442, 550; 370/331

[56] References Cited

U.S. PATENT DOCUMENTS

| | | | |
|---|---|---|---|
| 5,081,679 | 1/1992 | Dent ........................................ | 380/48 |
| 5,345,448 | 9/1994 | Keskitalo ................................ | 370/95.3 |
| 5,410,733 | 4/1995 | Niva et al. ............................... | 455/33.2 |
| 5,483,668 | 1/1996 | Malkamaki et al. .................... | 455/33.2 |
| 5,524,009 | 6/1996 | Tuutijarvi et al. ...................... | 370/95.3 |

FOREIGN PATENT DOCUMENTS 0 530 165 A3  3/1993  European Pat. Off. .

Primary Examiner—Edward F. Urban
Assistant Examiner—Thuan T. Nguyen
Attorney, Agent, or Firm—Perman & Green, LLP

[57] ABSTRACT

The invention is related to a method for improving handover in reception and transmission in a digital cellular mobile communication system including base stations and mobile stations, in which mobile station receives from a base station a handover command in the middle of speech reception or transmission on a first reception or transmission channel, whereby in the handover, the reception/transmission is changed to a second reception or transmission channel. Particularly the invention is related to mobile communication systems based on time division multiple access, in which transmission and reception occur in bursts in separate time slots. In the method according to the invention, speech is sampled, or, in transmission, it is A/D converted (32), and in reception, it is D/A converted (22) during the handover and stored in memory, e.g. in buffers, and taken into use in reception during the handover by D/A converting (24) it for a loudspeaker, and in transmission, by transmitting (34) it immediately after the handover. This method shortens the silent period in the handover.

8 Claims, 5 Drawing Sheets

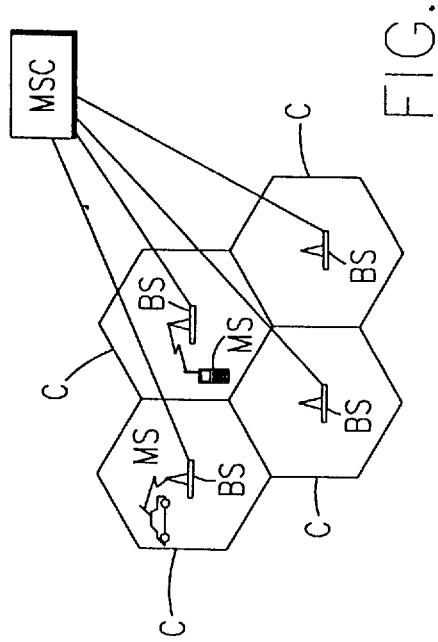
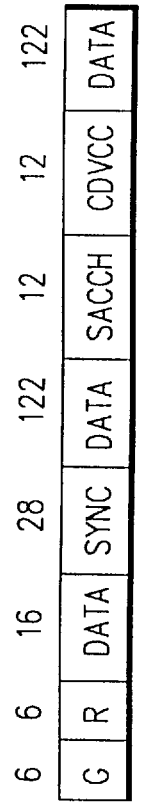
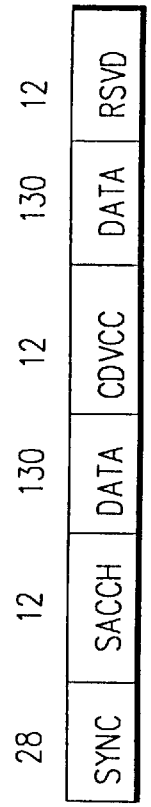

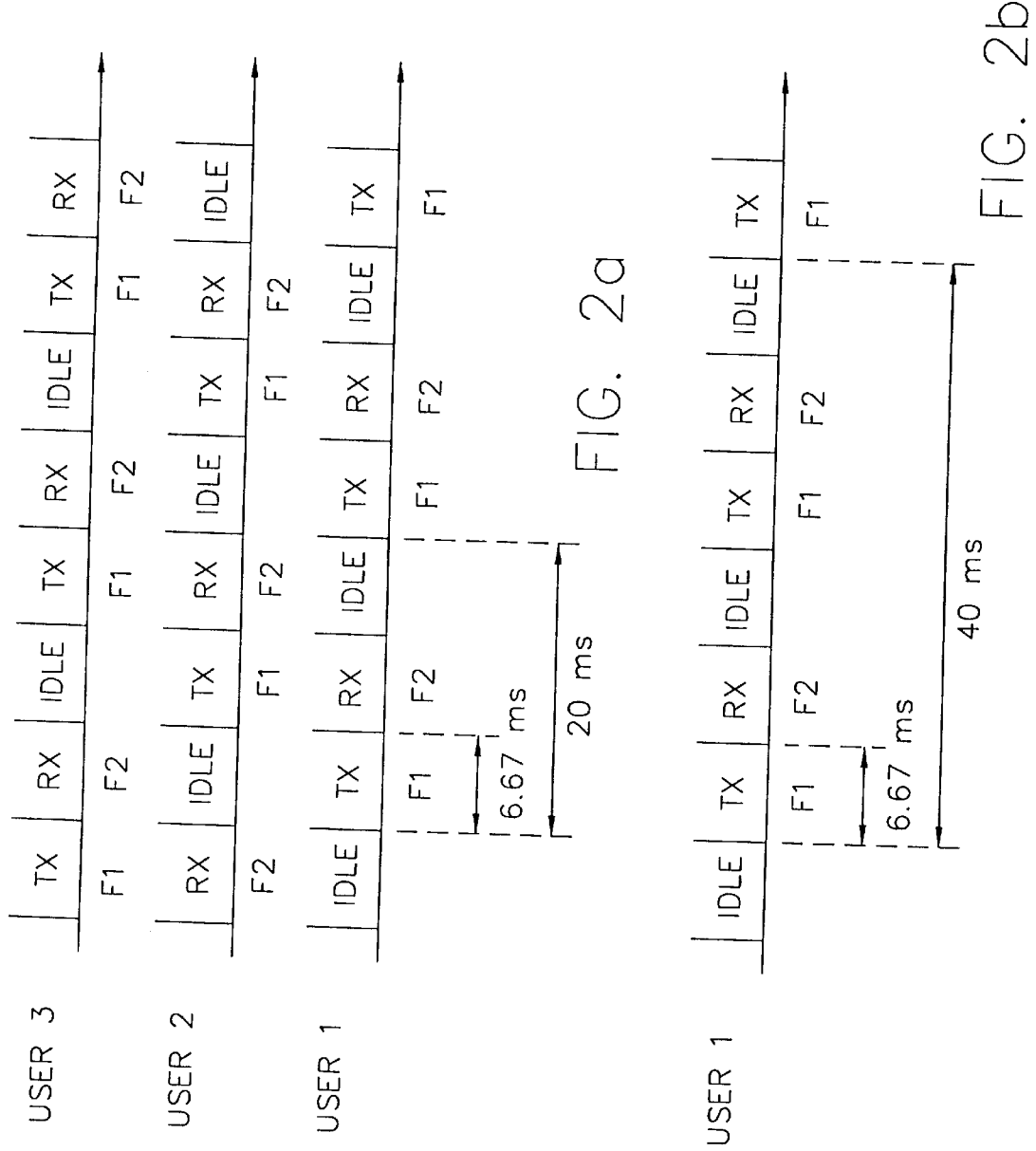

METHOD FOR IMPROVING HANDOVER

BACKGROUND OF THE INVENTION

The present invention is related to a method for improving handover in reception and transmission in a digital cellular mobile communication system, which includes base stations and mobile stations, in which a mobile station receives from a base station a handover command during the reception or transmission of speech on a first reception or transmission channel, whereby in the handover the reception/transmission is changed to a second reception/transmission channel. Particularly the invention is related to mobile systems based on time division multiple access, in which transmission and reception occur in bursts in separate time slots, and it is intended to be used in a mobile station.

Mobile systems in use today are mainly cellular systems, in which the system network comprises adjacent cells C, which all include a base station BS. Each of the cells thus comprises the coverage area of one base station. In addition, the cellular system also includes mobile stations MS and mobile telephone exchanges MSC which monitor several cells C and the traffic and operation of the system. The structure of the cellular system is depicted in FIG. 1.

To illustrate the invention and its background the operation of a cellular system and a mobile station will be described below using as an example the digital US TDMA mobile system based on time division multiple access and used in the United States. The system is described with reference to FIGS. 2a, 2b, 3, 4a and 4b, of which FIGS. 2a and 2b show the structure of the transmission and reception frames used in the system, FIG. 3 is a generalized block diagram of a digital mobile phone, and FIGS. 4a and 4b show the structure of time slots used in the US TDMA system.

In a digital system, information is processed using speech encoding and channel encoding. In a fixed digital telephone network, speech is transmitted as a digital signal which is PCM-coded (PCM =Pulse Code Modulation) to 64 kbit/s transmission rate. To transmit information at this speed in the radio network would require a broad channel bandwidth, so to fit the information in a narrow 30 kHz channel, the 64 kbit/s transmission rate is slowed down by means of speech encoding to 7950 bit/s.

In a digital mobile phone according to FIG. 3, transmission and reception occur as follows. In the first stage of the transmission sequence, analog speech is digitized 1 and encoded 2. Sampling at, say, 64 kbit/s is performed with an A/D converter 1, which may also be called a PCM-speech encoder 1, and the samples are segmented into 20-ms speech frames comprising 1280 bits (64,000 bit/s * 20 ms=1280 bit). 20 ms of analog speech is sampled with the PCM-speech encoder I using a kind of buffer into which it is collected one 20-ms speech frame at a time. When a 20-ms speech frame has been collected, it is taken to a speech encoder 2 which removes the recurrence in the speech signal waveform and characteristics which are not essential for the intelligibility of the signal. The input signal to the speech encoder 2 is updated at 20-ms intervals. Various known algorithms, e.g. VSELP (Vector Sum Excited Linear Predictive) coding, can be used for speech encoding 2. The encoding operations are carried out frame by frame. From the speech encoder 2 the bits are taken to the output at a transmission rate of 7950 bit/s, so 20 ms of speech at the speech encoder output comprises 159 bits (7950 bit/s * 20 ms=159 bit).

On the transmission path, noise is added to the signal and it becomes distorted. With channel encoding, both the speech and the signalling information are protected against disturbances on the radio channel. After the speech encoding 2, channel encoding 3 is performed in two stages, whereby first some of the 159 bits (12 most significant bits) are protected with block code 3a (=CRC, Cyclic Redundancy Check) and then these and the next significant bits are further protected with convolution code 3b (½ -rate convolution coding), and some of the bits are taken unprotected. Error correction protecting against random errors is based on comparing redundant bits produced by the convolution codec 3b. The half-rate convolution coding doubles the number of bits, thereby increasing the redundancy of the speech frame. Of the speech information only certain bits are convolution coded 3b to minimize the bandwidth requirement. To facilitate error detection, a CRC generator 3a produces parity bits from the twelve most significant bits by dividing by a certain polynomial formula. The remainder bits constitute the CRC parity bits. If dividing the received bits by the same polynomial formula as in the transmission does not result in parity bits identical with the received parity bits, then the receiver (channel decoder 15 and control unit 19) will know that an error has occurred in the information. When an error is detected, the information frame is corrected or rejected. As a result of codings 2, 3a, 3b, one frame comprises 260 bits.

As shown in FIG. 3, signalling and logic messages come directly from the control unit 19, which controls the blocks of the telephone, to the block coding block 3a and, therefore, these data messages are naturally not speech encoded 2. Similarly, signalling and logic messages received in the reception, such as the so-called call paging messages sent to a mobile station by a base station, are taken from the channel decoding block 15 to the control unit 19.

So, all in all it is sent 260 bits per one 20-ms speech frame. Deep fadings on the radio path may distort several bits in one burst and result in the rejection of the whole frame. The effect of burst errors is diminished by interleaving 5. Thus, the 260 bits of a frame are interleaved, thereby spreading the data stream (message) into several time slots. Transmission errors usually occur as error bursts, and inter-leaving aims to spread them evenly across the transmitted data, thereby optimizing the channel decoding.

A burst to be transmitted, shown in FIG. 4a, is generated 6 by adding to the inter-leaved data a training sequence, tail bits and guard time. Advantageously, the burst generation block 6 includes a buffer register into which the transmission burst is collected before transmission.

In the US TDMA system used in the United States, a digital traffic channel implemented with technology based on time division multiple access (TDMA) is defined as a time slot of a radio frequency channel. The radio frequency channel can be divided into either three full-rate or six half-rate digital traffic channels (time slots). The length of a TDMA frame divided into six time slots is 40 ms, and the length of each time slot is 6.67 ms. A time slot comprises 162 symbols, and each symbol comprises two bits, so there are 324 bits altogether in a time slot, of which 260 bits contain the data. On a full-rate channel a mobile phone uses for both the transmission TX and reception RX two time slots in a frame (40 ms), as shown in FIG. 2a. On a half-rate channel a mobile phone uses only one time slot in a TDMA frame for the transmission TX and one time slot for the reception RX, as shown in FIG. 2b. The transmission time slot TX and reception time slot RX are always followed by an idle time slot IDLE, which there will be four in the case of a half-rate channel.

FIG. 4a shows the structure of the 6.67-ms TX time slot sent by the mobile phone in the US TDMA system, and FIG.

4b shows the structure of the 6.67-ms RX time slot sent to the mobile phone by a base station. The transmission time slot TX sent by the mobile phone includes a guard time G, power ramp up interval R, speech and channel encoded speech information DATA, synchronization word SYNC and base station identifier CDVCC (Coded Digital Voice Colour Code), and in the reception (reception time slots), instead of the guard time G and power ramp up interval R, extra time RSVD (Reserved). As can be seen from the numbers in FIGS. 4a and 4b representing the amount of bits, there are altogether 324 bits in a time slot, of which 260 are data bits (in the case of speech, data bits containing speech). A burst to be transmitted is generated as described above in connection with FIG. 3, whereby speech is first sampled into 1280 bits and digitized with an A/D converter 1, speech encoding into 159 bits is carried out in a speech codec 2 (using e.g. the VSELP algorithm), channel encoding into 260 bits is carried out in a channel codec 3, and the other bits of the time slot are added in the burst generation block 6 to generate the 324-bit transmission burst which is stored in a buffer register.

From the buffer register the burst to be transmitted is taken to a modulator 7 (such as a $\pi/4$-DQPSK, or Differential Quadrature Phase Shift Keying modulator) which modulates the burst for the transmission. The $\pi/4$-DQPSK modulation method is a digital modulation method in which the information is contained in phase changes.

A transmitter 8 mixes the modulated burst through one or more intermediate frequencies to the transmission frequency (824 to 849 MHz) and transmits it via an antenna to the radio path. The transmitter 8 is one of three radio frequency blocks RF. A receiver 9 is the first block on the reception side, and it performs functions which are in reverse as compared to the transmitter 8. The third RF block is a synthesizer 10 which generates frequencies.

Operations are carried out in the reception that are reverse to those performed in the transmission. Following the RF receiver 9 and demodulator 11 there comes bit detection 12 using e.g. a channel equalizer, in which the bits are detected from the received samples, or, the transmitted bit sequence is found out. The detection is followed by deinterleaving 13. After deinterleaving, an error burst, which possibly occurred on the transmission path, is converted into individual error bits that can be corrected in channel decoding. So, after deinterleaving, the detected bits are channel decoded 15 and the error sum is checked using a cyclic redundancy check (CRC). If division of received bits by the same polynomial formula that was used in the transmission (encoding) does not result in parity bits identical to the received parity bits, an error has occurred in the information. When an error is detected, the information frame is corrected or rejected. The channel decoding block 15 not only tries to detect errors but also attempts to correct bit errors occurred in the transmission of the burst. After the channel decoding, the 159-bit speech frame contains the transmitted parameters for speech, which the speech decoding block 16 uses to generate a digital speech signal. The digital speech signal is converted to an analog speech signal in a D/A converter 17. The 20-ms speech signal is collected in a kind of buffer, wherefrom it can be taken to the D/A converter that converts the signal for the loudspeaker 18.

The transceiver includes as an essential controlling unit of the mobile station a control unit 19, which controls substantially all blocks 1 to 18 and coordinates their operation and controls timing. The control unit 19 usually includes a microprocessor among other things.

When a mobile phone is switched on, it is first initialized, after which it goes into the idle state to wait for a mobile paging call transmitted on the control channel or for a user-originated call. Having received a paging call the phone responds to it by attempting to set up a connection to the base station. During the call, the base station monitors the connection quality by means of a mobile assisted handover (MAHO) measurement function, with which the base station may instruct the mobile phone to measure the received signal strength indicator (RSSI) on up to 24 different channels. It is characteristic of a cellular system that not all calls can be terminated within the area of one cell. For instance, a car moving on a motorway may pass by several cells during one call. To facilitate uninterrupted calls, a handover system was created. It is based on the idea that with continuous signal strength measurement at various locations of a cell the cellular system (mobile exchange) can sense when a phone, which is having a call, is moving from a cell into another, whereby the call can be switched over from the first cell (first channel) to the second cell (second channel) "on the move", without losing or interrupting the ongoing call. If the base station finds out on the basis of the MAHO measurement that the connection quality has dropped below a predetermined threshold value, it informs the mobile exchange about the fact and hands the call over to another base station (on the basis of the MAHO measurement).

Several factors influence the decision concerning handover; these include the transmission power of the mobile station, the base station serving the mobile station at that moment, and the neighbouring base stations, the quality of the connection in both directions, represented by the bit error rate (BER), etc. On the basis of these different factors the base station centre (BSC) makes a decision about the handover: whether or not a handover is carried out, and if it is, which is the channel/base station to which the call is handed over. When the base station centre makes a decision about the handover, it sends to the mobile station a handover command which includes the necessary information, such as the data about the new channel and time slot.

For reception, the mobile station operates in the handover as follows: it finds in the incoming signal the synchronization word SYNC of its own time slot RX, on the basis of which it is synchronized to a new base station, whereafter it immediately starts normal reception. However, handover takes some time, during which the mobile station only deals with operations related to the handover (such as adaptation to the channel, settling of the synthesizer to the new channel, getting into synchronization) and speech is therefore not processed, whereby the speech coding functions and audio functions (ie. the speech decoder, D/A converter, speaker, and correspondingly, the microphone, A/D converter and speech encoder) are muted for the duration of the handover because there is no speech in either direction but the connection to the base station is cut off. When synchronization has been obtained, the mobile station can start normal transmission. The handover is then completed.

For transmission, the mobile station operates similarly as in reception, ie. first it finds in the signal coming from the base station its own reception time slot RX, on the basis of which it can calculate the moment of its own transmission time slot.

Depending on the mobile system, the handover may take about 30 to 80 ms, which can be heard on the mobile station as a silent pause. In the reception, one attempted solution for this problem has been to echo the so-called sidetone, which is carried from the earpiece to the microphone, back to the earpiece, albeit a little muffled. Then, in the reception, the silent pause is not so conspicuous. However, this method is viable only in the reception. One alternative for removing the silent pause occurring during a handover, or for making it more inconspicuous, is to feed noise to the mobile phone's earpiece during handover. However, the user may find this, too, disturbing.

SUMMARY OF THE INVENTION

It is the object of the present invention to shorten the pause occurring in a mobile phone during a handover both in the reception and in the transmission. This is achieved by sampling the speech (in transmission, using A/D conversion, and in reception, using D/A conversion) during a handover (or before the handover in the reception, if the last completely received speech burst preceding the handover was already sampled before the handover). Advantageously, the sampledicoded speech is stored in memory, e.g. in buffers of the A/D and D/A converters, and taken into use during the handover in the reception and immediately after the handover in the transmission. With this method, the silent pause in the handover will become shorter. So the invention is based on the idea that the speech coding fumctions and audio functions be kept active during a handover, whereas in prior art methods they are made inactive for the duration of a handover.

In the case of transmission, sampled speech means here primarily speech that has been A/D converted, or sampled, but in the invention, convolution coding, interleaving and generation of the transmission burst may also be carried out for the sampled speech during a handover. However, in a first embodiment of the invention, only A/D conversion is carried out during the handover. Preferably, the memory is a buffer register into which the burst to be transmitted is stored. Correspondingly, sampled/coded speech in the case of reception means here a received speech burst for which it has been carried out bit detection, deinterleaving, channel decoding, speech decoding, but not D/A conversion. The decoded analog speech signal is collected in a buffer for a D/A converter.

Advantageously, the invention is used in a mobile station in which speech is transmitted in bursts or other short data packets, e.g in mobile communication systems based on time division multiple access. Then, if a burst has been received before a handover, it is not rejected because of the handover but it is taken through the receive branch in the mobile phone, decoding is performed and the burst is taken to a loudspeaker and it can even be reproduced a few times. This shortens the handover or the silent pause occurring during the handover. Correspondingly, in the transmission, speech sampling is continued for at least one speech frame during the handover, whereby, when the handover is completed, the last encoded speech frame can be sent immediately, which shortens the handover or the silent pause occurring at the other end of the connection during the handover.

In reception, it is characteristic of the invention that
the last completely received speech burst preceding a handover command is decoded in the mobile station into digital samples and
said digital samples are D/A converted and reproduced by the loudspeaker of the mobile station during the handover.
In transmission, it is characteristic of the invention that
during a handover, an analog speech signal is sampled into digital speech samples in the mobile station and
after the mobile station has been synchronized to said second transmission channel said digital speech samples are encoded and transmitted.

BRIEF DESCRIPTION OF THE DRAWING

The invention will be described below in greater detail with reference to the accompanying drawings in which FIG. 1 shows the structure of a cellular mobile telephone system, FIG. 2a shows the full-rate frame structure used in the US TDMA mobile telephone system, FIG. 2b shows the half-rate frame structure used in the US TDMA mobile telephone system, FIG. 4a shows the structure of a time slot transmitted from a mobile phone used in the US TDMA mobile telephone system, FIG. 4b shows the structure of a time slot received by a mobile phone used in the US TDMA mobile telephone system.

DETAILED DESCRIPTION OF THE INVENTION

Figure 3:
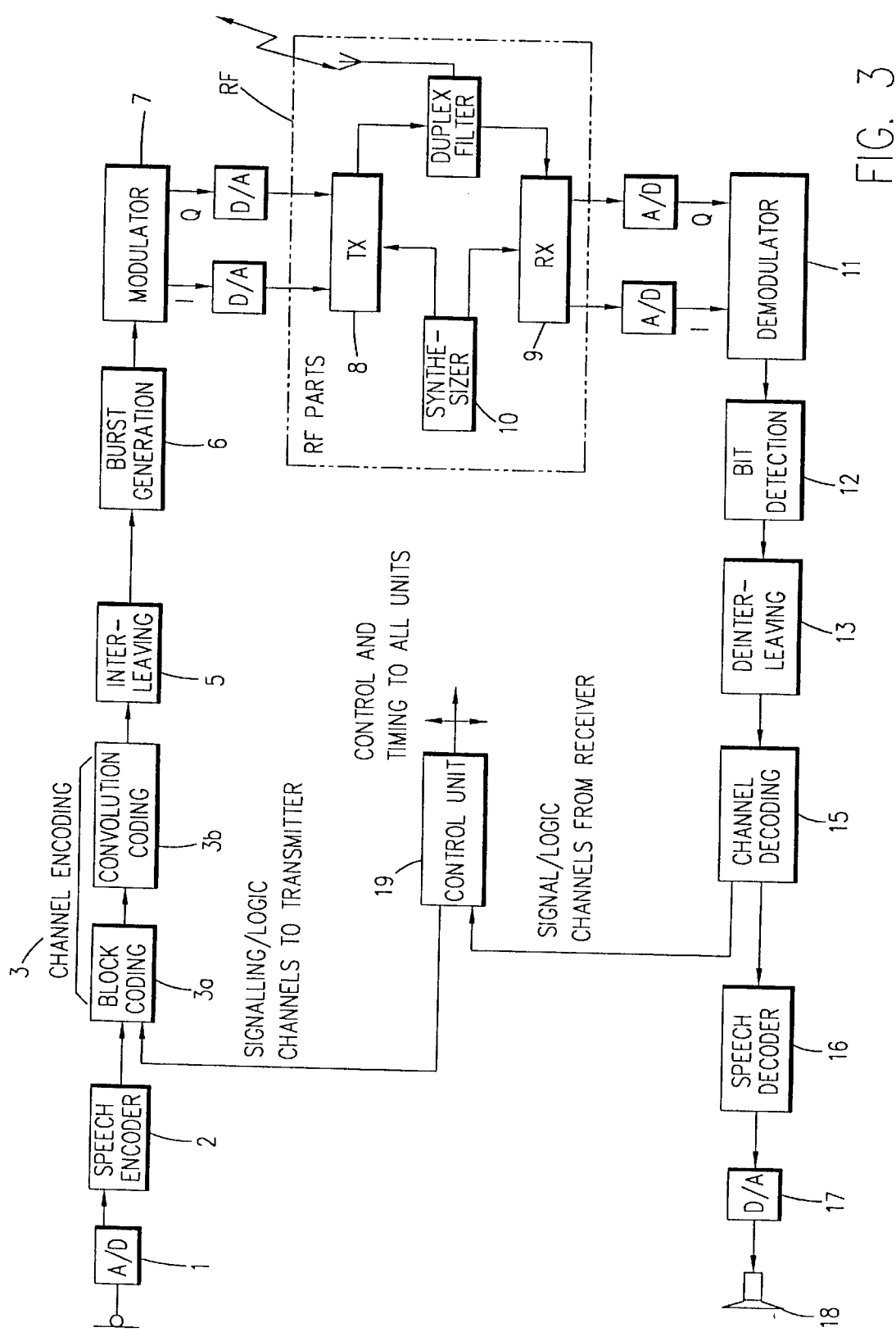
FIG. 3 shows a block diagram of a digital mobile phone.
Figure 5:
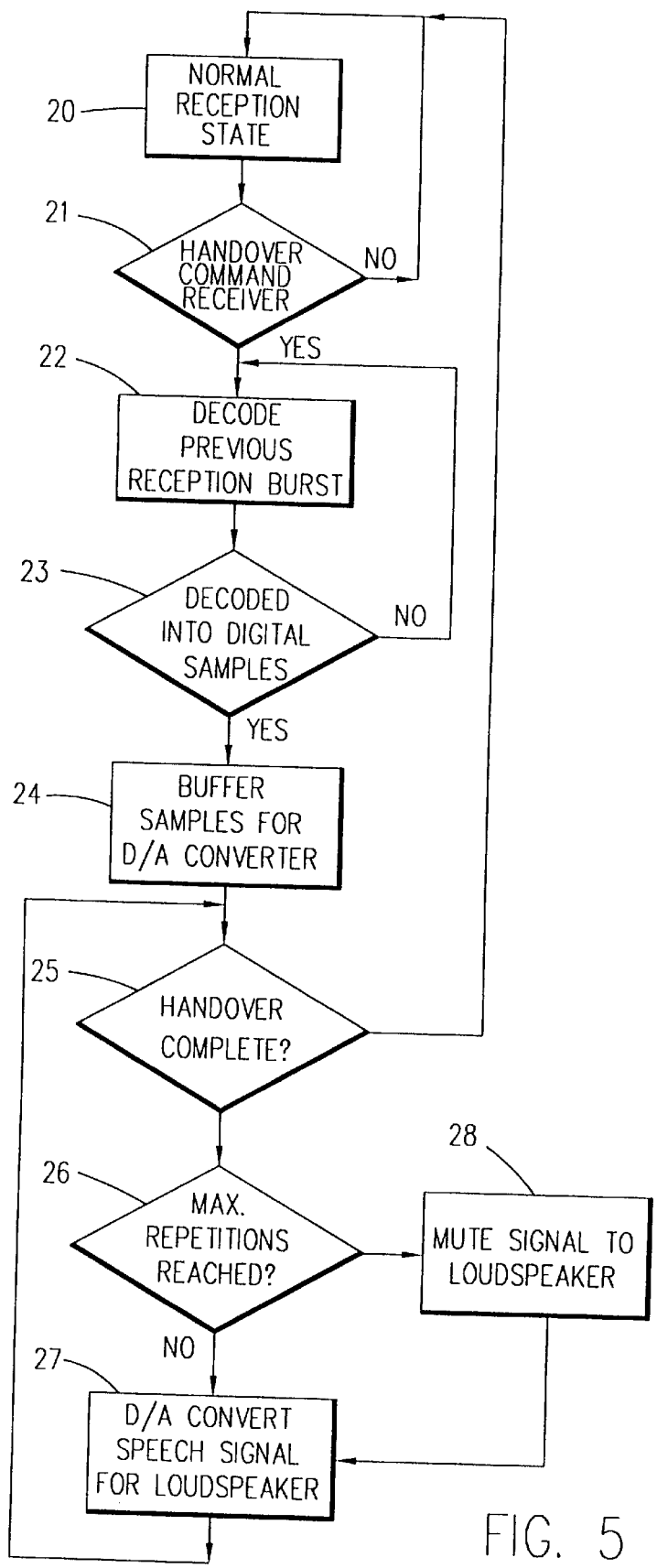
FIG. 5 is a flow chart illustrating the method according to the invention in reception.
Figure 6:
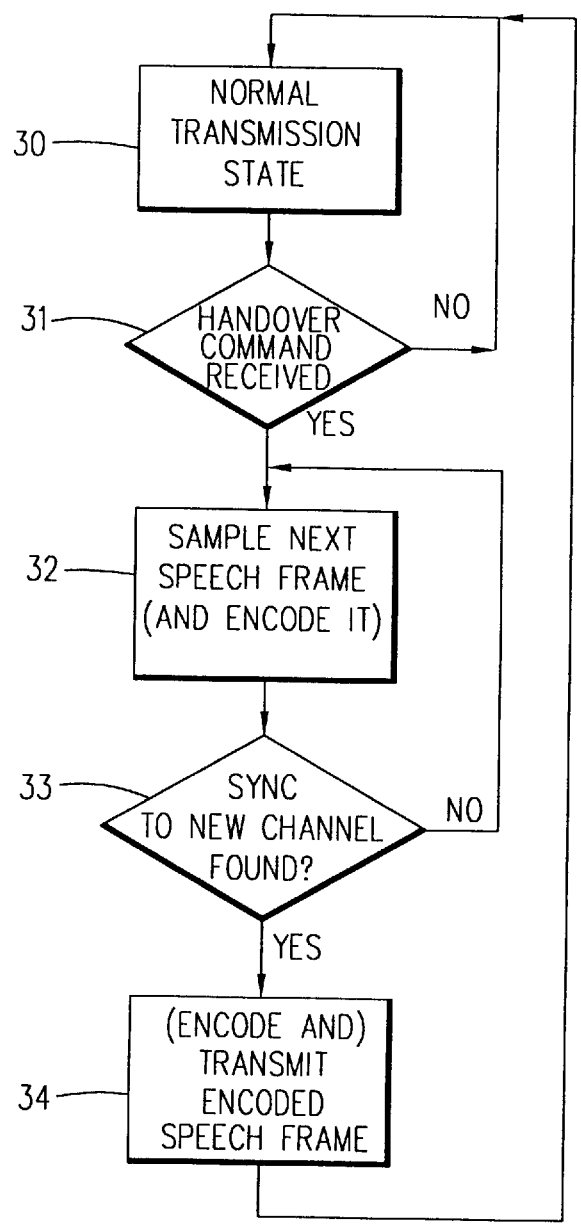
FIG. 6 is a flow chart illustrating the method according to the invention in transmission.

The invention is described using the US TDMA system as an example and referring mainly to FIGS. 3, 5 and 6. When a mobile station has, in normal operation 20 (FIG. 5), received a speech burst, the receive branch functions are performed for the burst, as shown in FIG. 3. An RF receiver 9 mixes the signal down to an intermediate frequency and a demodulator 11 performs modulation to the base frequency, followed by bit detection 12 and deinterleaving 13. After the deinterleaving the detected bits are channel decoded 15, and the error sum is checked using the cyclic redundancy check (CRC). After the channel decoding 15 the 159-bit speech frame contains the transmitted parameters for speech, by means of which the speech decoding block 16 generates the digital speech signal. The digital speech signal (ie. the digital samples) is converted into an analog speech signal in a D/A converter 17. The D/A converter is fed from a buffer containing a 20-ms speech signal, and the converted speech signal is reproduced by a loudspeaker 18. The D/A conversion can be performed continuously in the background, depleting the 20-ms speech buffer.

In prior art methods, the speech coding functions and audio functions are muted for the duration of a handover, which means that a burst received before the handover and not yet D/A converted for the loudspeaker is lost.

However, in the method according to the invention, the receive branch is allowed to decode the previous received speech burst 22 even if the mobile station had received a handover command 21 in the middle of the reception. The present invention utilizes 20 ms of decoded speech during the handover, whereby, after the previous 20-ms speech burst has been decoded into digital samples (operation 23 in FIG. 5) for a D/A converter, these are stored 24 in a buffer for the D/A converter and D/A converted 27 for the loudspeaker during the handover. If the handover is not yet completed 25, which means that the mobile station has not found the incoming reception time slot synchronization word SYNC (shown in FIG. 4b) on the new channel, it is possible, if the handover is longer than the decoded speech burst (ie. in the US TDMA system, longer than 20 ms), to repeat 27 the speech burst in question, advantageously once or twice, however six times at the most, by D/A converting it again for the loudspeaker. After too many repetitions, the reproduction may be heard as a snap in the earpiece, which is undesirable. Therefore, the number of repetitions has to be limited advantageously to two or three, six at the most. When the maximum number of repetitions is reached 26, the signal to the loudspeaker is muted 28 or its level is zeroed, whereby nothing should be heard on the loudspeaker 18, or alternatively, noise is fed to the loudspeaker for the rest of the duration of the handover. During the handover, the mobile station finds the synchronization word SYNC in the time slot of the new channel and is synchronized to the new channel, whereby the mobile station goes into the normal reception state 20. When the handover is complete 25, transmission from the new channel, or the new base station, can be received.

In transmission, prior art methods operate so that the speech coding functions are muted for the duration of a handover, and only when the mobile station has been synchronized to the new channel, will the A/D converter 1 begin sampling the speech burst to be transmitted next. Then the handover will cause a silent pause the duration of which equals the duration of the handover until synchronization is found added to the duration of the speech burst sampling, because the next speech burst can be sent only when it is completely sampled, which in the US TDMA system takes 20 ms in a full-rate system and 40 ms in a half-rate system.

In the present invention, however, the speech coding functions are not muted for the duration of a handover, but speech coding will remain active during a handover.

Thus, referring to FIG. 6, when a mobile station receives 31 from a base station a handover command while the mobile station is in the normal transmission state 30, it is performed 32, in the method according to the invention, speech sampling during the handover (during the sync search), which means that a 20-ms speech frame is collected in the A/D converter 1. The last encoded speech frame is taken into use and transmitted 34 immediately after synchronization has been found 33, ie. when the mobile station has been synchronized to the transmission channel of the new base station, whereby the silent period in the handover is shortened for the length of the speech burst, which means that in the US TDMA system the silent period is shortened by 20 ms. As a 20-ms speech frame has been collected in the buffer of the A/D converter during the handover, the other functions of the transmit branch, such as speech encoding 2, channel encoding 3, interleaving 5, burst generation 6 and transmission, can be performed immediately after synchronization has been found. Alternatively, these functions may be performed during the handover, whereby the complete transmission burst may be stored in the buffer register of the burst generation block 6, wherefrom it can be taken into use immediately after synchronization has been found. However, since the transmission has to occur synchronized at intervals of 20 ms (or 40 ms in a half-rate system), it is simpler to perform only the sampling I during the handover, whereby it is easier to read the transmission burst into the transmission buffer 6 at regular intervals without stopping the functions in order to wait for the 20-ms or 40-ms synchronization for the transmission. When it is only collected a 20-ms speech burst in the buffer of the A/D converter 1, the speech burst in question can be transmitted forward in the transmission chain I immediately after synchronization has been found and at the same time start sampling the next 20-ms speech frame.

The method according to the invention shortens the silent pause occurring in a mobile station during a handover. Otherwise (commands related to the handover, synchronization, etc.) the handover is carried out in the same way as in the prior art.

What is claimed is:

1. A method for improving handover in reception in a digital cellular mobile communication system which includes base stations and mobile stations in which transmission and reception occur in bursts in separate time slots and in which one of said mobile stations receives from one of said base stations a handover command in the middle of speech reception on a first reception channel, whereby in the hand-over, reception is changed to a second reception channel, wherein, during the handover, communication of voice signals between said one mobile station and said one base station via said first channel is cut off prior to inception of communication via said second channel, the method comprising steps of:

in the mobile station, decoding into digital samples the last completely received speech burst over said first channel preceding the handover command; and during the handover, converting by D/A said digital samples and reproducing said digital samples on a loud speaker of the mobile station.

2. The method of claim 1, wherein upon a duration of said speech burst which is shorter than the duration of the handover, there is a step of repeating the speech burst by D/A converting the speech burst again for the loud speaker.

3. The method of claim 2, further comprising steps of storing said decoded speech burst in a buffer in the mobile station in the form of digital samples, and repeating said decoded speech burst by reading it from the buffer.

4. The method of claim 2, wherein, in said repeating step said same speech burst is repeated six times at the most, and if the handover is still uncompleted, there is a further step of muting the signal to the loudspeaker for the rest of the duration of the handover after repetitions of said speech bursts.

5. A method for improving handover in transmission in a digital mobile communication system which includes base stations and mobile stations, in which transmission and reception occur in bursts in separate time slots and in which one of said mobile stations receives from one of said base stations a handover command in the middle of speech transmission on a first transmission channel, whereby in the handover, transmission is changed to a second transmission channel on which the transmission continues after the mobile station has been synchronized to said second transmission channel, wherein, during the handover, communication of voice signals between said one mobile station and said one base station via said first channel is cut off during the handover prior to inception of communication via said second channel, the method comprising steps of:

during the hand-over, sampling an analog speech signal communicated via said first channel into digital speech samples in the mobile station; and after the mobile station has been synchronized to said second transmission channel, encoding and transmitting said digital speech samples.

6. The method of claim 5, further comprising a step of collecting a sampled digital speech frame in a buffer, wherefrom it can be read for transmission after the mobile station has been synchronized to said second transmission channel.

7. The method of claim 5, wherein, after the mobile station has been synchronized to said second transmission channel, there are steps of speech encoding, channel encoding, and interleaving a sampled digital speech frame; and generating a transmission burst which contains said speech frame and which is transmitted, and furthermore, after the mobile station has been synchronized to said second transmission channel, the sampling of the next speech frame is begun.

8. The method of claim 5, wherein an analog speech signal is sampled into digital speech samples in an A/D converter.

* * * * *